US005794259A

United States Patent [19]
Kikinis

[11] Patent Number: 5,794,259
[45] Date of Patent: Aug. 11, 1998

[54] APPARATUS AND METHODS TO ENHANCE WEB BROWSING ON THE INTERNET

[75] Inventor: Dan Kikinis, Saratoga, Calif.

[73] Assignee: Lextron Systems, Inc. Saratoga, Calif.

[21] Appl. No.: 688,022

[22] Filed: Jul. 25, 1996

[51] Int. Cl.$^6$ ..................................................... G06F 7/06
[52] U.S. Cl. ................... 707/507; 707/513; 395/200.48; 705/26; 345/352
[58] Field of Search ............. 395/200.48; 707/505–507, 707/501; 345/352; 705/26, 27

[56] References Cited

U.S. PATENT DOCUMENTS

| | | | |
|---|---|---|---|
| 5,325,478 | 6/1994 | Shelton et al. | 707/507 |
| 5,404,294 | 4/1995 | Karnik | 707/507 |
| 5,450,537 | 9/1995 | Hirai et al. | 707/507 |
| 5,523,942 | 6/1996 | Tyler et al. | 707/507 |
| 5,555,325 | 9/1996 | Burger | 382/309 |
| 5,625,465 | 4/1997 | Lech et al. | 358/448 |
| 5,640,577 | 6/1997 | Scharmer | 395/768 |
| 5,666,502 | 9/1997 | Capps | 345/352 |

OTHER PUBLICATIONS

CGI Programming on the WorldWide Web Gundavaram pp. 407–411, Mar. 1996.
Special Edition Using Netscape™ 2 Brown et al. pp. 263–285 & 786–814, 1995.

*Primary Examiner*—Larry D. Donaghue
*Attorney, Agent, or Firm*—Donald R. Boys

[57] ABSTRACT

A system for filling fields in Internet forms follows executable control code to associate stored fill entities with field names, and to place the stored fill entities into fields in the Internet form. In one embodiment association is automatic to the extent that names of fill entities match field names in the form. In another embodiment a display list is provided superimposed on the form, the display having selectable stored entity names. In this embodiment of the invention entity names may be selected from the superimposed list and caused to fill selected fields sin the form. In some embodiments both features are provided. In yet another embodiment a WEB browser is adapted to download database entities from a remote server through an Internet connection directly to a memory que without immediate display. The stored entities are separately selectable from the memory que for display and processing independent of operation of the WEB browser or the Internet connection.

5 Claims, 4 Drawing Sheets

Beginning of document ...

line n          < P > < FONT SIZE = + 1 > Your E-mail address: < /FONT > line n + 1      < BR > INPUT NAME = "E-MAIL" TYPE = "TEXT" ROWS = 1 SIZE = 40 > line n + 2      < P > < FONT SIZE = + 1 > Your name: < /FONT > line n + 3      < BR > < INPUT NAME = "Name" TYPE = "TEXT" ROWS = 1 SIZE = 40 > line n + 4      < P > < FONT SIZE = + 1 > Company Name < /FONT > (if applicable):

line n + 5      < BR >< INPUT NAME = "Com name" TYPE = "TEXT" ROWS = 1

SIZE = 40 >

.......end of document

Beginning of document ...

line n      < P > < FONT SIZE = +1 > Your E-mail address: </FONT > line n+1      < BR > INPUT NAME = "E-MAIL" TYPE = "TEXT" ROWS = 1 SIZE = 40 > line n+2      < P > < FONT SIZE = +1 > Your name: </FONT > line n+3      < BR > < INPUT NAME = "Name" TYPE = "TEXT" ROWS = 1 SIZE = 40 > line n+4      < P > < FONT SIZE = +1 > Company Name </FONT > (if applicable):

line n+5      < BR >< INPUT NAME ="Com name" TYPE = "TEXT" ROWS = 1 SIZE = 40 >

.......end of document

*Fig. 1*

APPARATUS AND METHODS TO ENHANCE WEB BROWSING ON THE INTERNET

FIELD OF THE INVENTION

The present invention is in the field of Internet World Wide WEB (WWW) browser technology, and pertains more particularly to tools for filling in forms and downloading information from the WWW.

BACKGROUND OF THE INVENTION

Part of the global network termed the Internet, called the World Wide Web (WWW or WEB) has a lot of information and services available to users. Often when browsing the WEB, one encounters forms to fill out, mostly for buying or subscribing to services or products. These forms are often long, asking for lots of information, and tedious to fill out. One reason there are so many forms is that very often, services that are provided as free are not free at all. Instead, one trades information for give-away software and or services.

The goal of marketing schemes on the Internet, as is true elsewhere, is to collect as much information about potential or actual customers as is possible or practical. Such information can lead to future sales, and can also be sold to other organizations. Hence during long browse sessions on the WEB, one may have to fill in several forms, mostly asking for the same or similar information over and over. A person actively using the WEB may waste quite some time in filling out forms.

In another aspect of Surfing the Net (using the Internet) users access news groups, which are very good places to trade information with mostly other users about common interests. A myriad of different news groups have developed, and any one person can easily be interested in 5-10 or even many more news groups. In accessing news groups there is a problem in the way one has to download information. Typically a file is first downloaded containing headers only. Then, as the user selects items, each item is specifically downloaded. Very often it can take 5-10 seconds or more, before the next item is downloaded. On very active news groups, that have more than 200 postings a day, that accumulated time can be considerable, limiting the usefulness of the Internet.

What is needed in the first instance described above, that of filling in forms on the Internet, is a system that allows a user to link specific pre-stored data, usually data unique to the user, with fields in forms encountered on the Internet, such that a pipeline is established for quickly and efficiently filling fields in forms.

In the second instance described above, that of accumulated delay in downloading information from the WWW, such as from newsgroups, what is needed is a caching system whereby information from newsgroups may be prefetched and stored locally, that is, at the user's computer, where it may be accessed off-line.

SUMMARY OF THE INVENTION

In a preferred embodiment of the invention a system for filling fields having field names in forms encountered on the Internet is provided, comprising: a central processing unit (CPU); a display operable by the CPU; stored fill entities associated with tags accessible by the CPU; and control code executable by the CPU. The CPU, executing the control code, compares the field names in the forms with the tags of the stored fill entities, and places fill entities in fields wherein the tags match the field names.

In a further embodiment of the invention the system comprises a display bubble displayable by the CPU executing the control code, the display bubble positionable by a user on the display to select fields to be filled, the display bubble displaying multiple tags for stored fill entities, the tags selectable by the user to cause the stored entities associated with the tags to fill the fields selected by the user.

The apparatus thus arranged makes possible a method for filling out forms on the Internet comprising steps of (a) selecting a field in an Internet form; (b) invoking a display of tags associated with multiple stored fill entities; (c) selecting one of the tags in the display of tags, causing the fill entity associated with the tag to be entered in the selected field in the form; and (d) repeating steps (a) through (c) until all of the fields in the form are filled. Another method according to the invention does not use the display of tags of fill entities, but instead relies on an automatic association of entity tags with field names, with field fill being accomplished to the greatest extent possible transparent to the user. The user may afterward check and correct the filled fields.

In another aspect of the invention a system for downloading and displaying data through an Internet connection from a remote server on the Internet is provided, comprising a computer having a memory and a display screen; and a WEB browser application adapted for displaying names of database entities on the remote server and having a facility for a user to select names of database entities to be downloaded. Database entities selected to be downloaded are downloaded to the memory rather than immediately displayed, and display of downloaded entities is separately selected from the memory, such that entities may be viewed from the memory while other entities are being downloaded, and may continue to be selected and viewed after the Internet connection is closed.

An associated method for downloading data entities from a server remote from a computer station comprises steps of (a) logging on to a remote server through an Internet connection; (b) selecting database entities to be downloaded and displayed; (c) downloading the database entities directly to a memory file rather than immediately displaying said database entities; and (d) separately selecting the database entities from the memory file for display independently of the downloading process and of the Internet connection.

Using these unique WEB browser enhancements provides speed and facility in downloading data and in filling out forms that has heretofore not been available to Internet users, and saves valuable time, hence cost in using the Internet.

BRIEF DESCRIPTION OF THE DRAWING FIGURES

FIG. 1 is an example of HTML script associated with an on-line form on the WEB.

DESCRIPTION OF THE PREFERRED EMBODIMENTS

Since a computer in conjunction with browsing the Internet is mainly a productivity or entertainment tool, a user wants to enforced wait times be as short as possible. Very often, if there are too many waits of too long duration, or if forms to be filled in are too cumbersome, the user will simply go away, and do something else, much like a customer not served quickly in a restaurant may get up and leave. What is needed are ways to reduce idle times in browsing as much as possible, but in a way that is entirely backwards compatible. The existing investment into the infrastructure of the Internet has reached a point where it would not be possible to make radical changes.

As described above in the Background section, users encounter many forms to be filled out in return for access to information or executable software that may be downloaded from servers on the Internet. Filling out such forms can be time consuming and boring.

A unique solution to the difficulty of form filling, according to an embodiment of the present invention, takes advantage of the fact that programmers typically use descriptive names in preparing WEB pages. FIG. 1 shows a small section of typical HTML3.0 code (Hyper Text Markup Language revision 3.0) as may be associated with a part of a WEB page. In line n+1 the field name n"Email" is clearly related to the label in line n "Your Email address", even though there is no strict convention in programming to provide such relationships. The reason is that programmers mostly use descriptive names in order to make code more readable. Following such an approach, it is quite possible that once the method described in this disclosure is available, an official appendix to future revisions of HTML may have a standard convention for the most used field names in forms.

Figure 2:
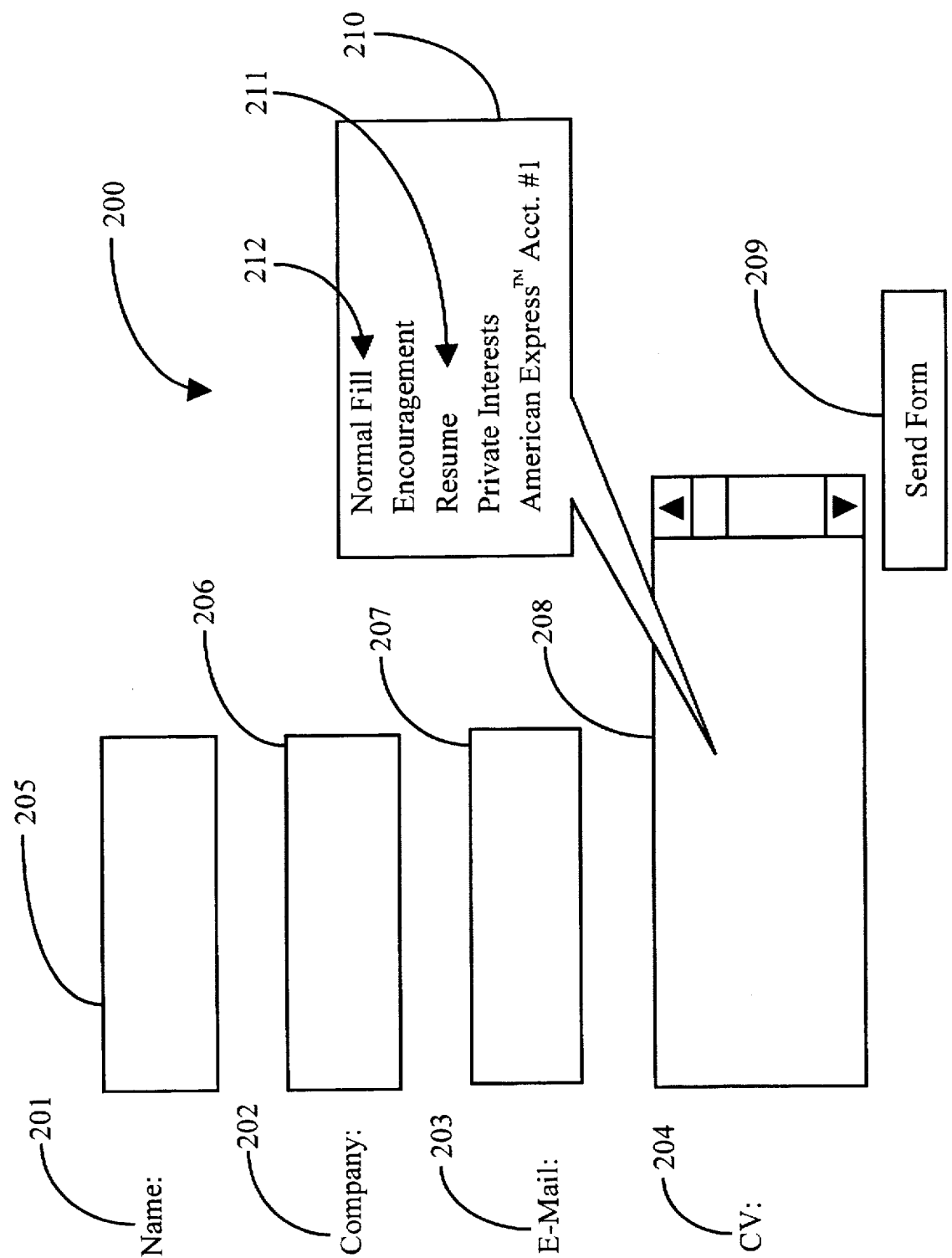
FIG. 2 is an illustration of a browsing tool for filling in Internet forms according to an embodiment of the present invention.

FIG. 2 is an illustration of an interactive tool for use in filling in form fields in forms encountered on the Internet. The tool according to an embodiment of the present invention allows a user to quickly link pre-stored information of the sort most usually required by forms to fields in forms, and to transfer such information to the form fields.

FIG. 2 shows a portion of a form as might be encountered on the Internet, including fields 205 labeled "Name" 201, 206 labeled "Company" 202, 207 labeled "E-Mail" 203, and 208 labeled "CV" 204. There is, in addition, an interactive button 209 labeled "Send Form" enabling a user to transmit a filled-in form.

As is well known in the art, the conventional process of filling in such a form is to move an on-screen cursor to a field, and to type in alphanumeric characters in the field. In an embodiment of the present invention, control code is provided to automatically fill in such forms when user activated. The control code may be a terminate-and-stay-resident (TSR) program, for example, or a plug-in module to a WEB browser application. In a preferred embodiment the control code of the invention is a plug-in to a WEB browser. It will be apparent to those with skill in the art how such a plug-in module is associated with a browser, without the necessity of providing such conventional details in this specification.

In a preferred embodiment of the present invention customized for a particular user, information, such as name, address, home phone number, business phone number, facsimile number, E-Mail address, company, and so on, is stored and accessible by the control code by association with a name tag. When a user encounters a form on the Internet, and wishes to fill in the form, he/she hits a "hot key", or key combination, which invokes the control code of the invention. The code executing matches field names in the form with tags to the prestored information about the user, and fills all of the fields for which a match is made. In some cases this may be all of the fields in the form. In other cases, some matches will not be found, or an inappropriate match will be made, and incorrect information will be entered in the form.

At this point the user need only peruse the filled-in form for accuracy. If incorrect information is in a field, it may be corrected. In a preferred embodiment another Hot Key or key combination, or key and mouse button combination causes the control code executing to display a bubble 210 having a selection list 212 of tags for prestored information. FIG. 2 shows how the bubble 210 could look on the screen, after being activated by holding a key and clicking a mouse button. The user can move a highlight bar 211 up and down, and select an item to be pasted into the field where tip (208) is pointing. It will be apparent to those with skill in the art that there are a variety of ways the bubble feature may be activated. For example, the code could be provided so one may move the conventional screen cursor to a field and provide the activating signal by a hot key, displaying the bubble. Movement of the highlight bar could then be by further cursor movement, as in drop-down menus, or by arrow keys. Any one of a variety of mechanisms might be incorporated for selection of a highlighted item in the list, which then is inserted into the field to which the bubble points.

In the example shown here the user is about to paste the content of the file tagged "resume" from a list 212 into the field 208 labeled CV (Curriculum Vitae) 204, with a single click of a button In an alternative embodiment the bubble may be invoked at the first use of the control code, and used with the "Normal Fill" selection to fill fields one at a time. Because several users may share the same system, the data is preferably stored in an encrypted manner, allowing a user to log-in as well as password protecting such access. By activating such a user profile, all other parameters may also be personalized, such as e-mail name, mail server, news server etc.

Figure 3A:
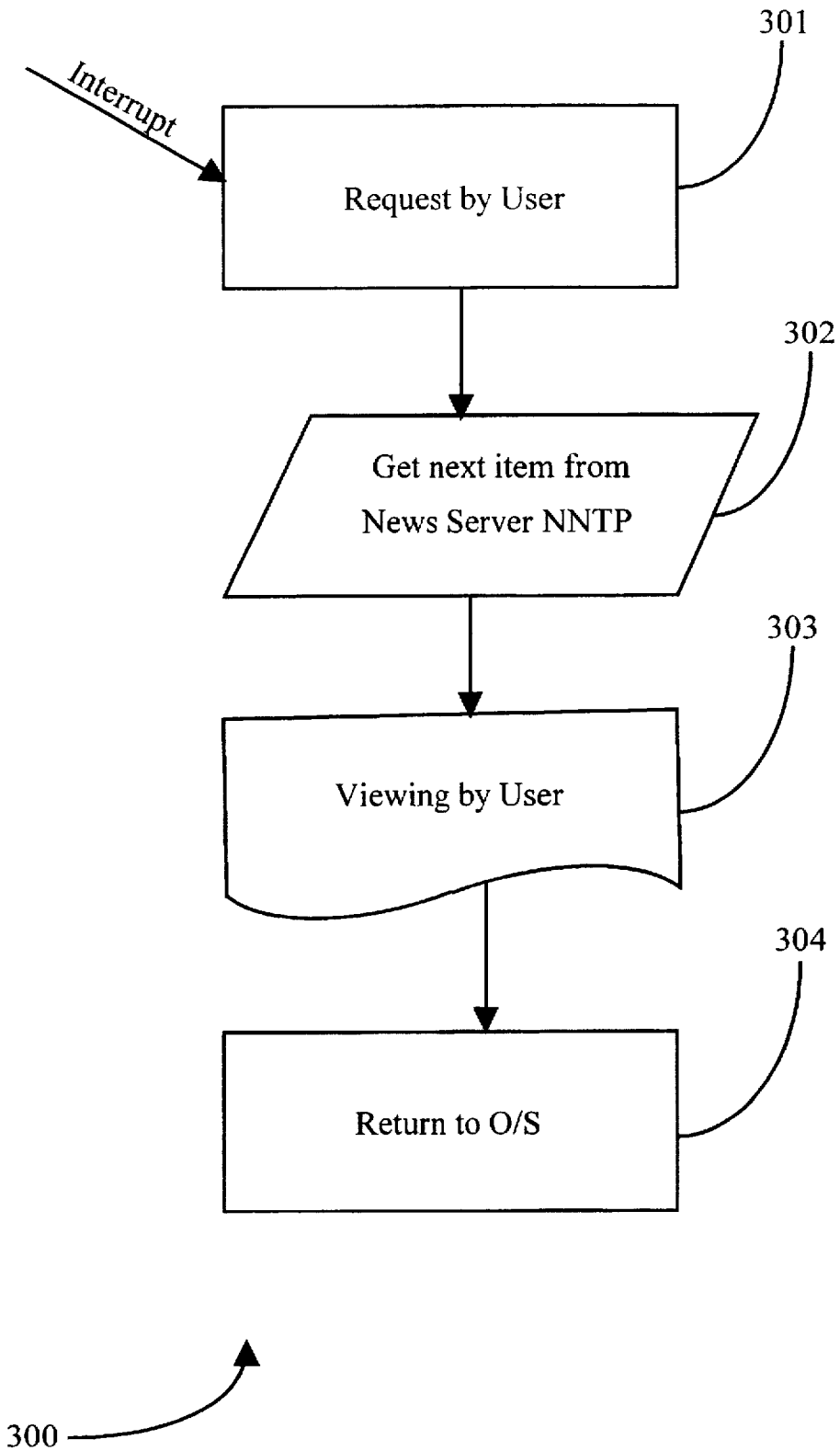
FIG. 3A is a flow diagram depicting the conventional process of accessing data from the Internet.

In another aspect of the present invention provision is made to enhance operation of downloading information from databases such as news groups on the Internet. FIG. 3A illustrates conventional operation of a process 300 of downloading data entities from an On-line news group at a remote server (remote from the users station). When a user logs on to a news group, a menu of indexed entities is displayed for selection by the user. The user selects an entity at step 301, and that entity is downloaded (Step 302) at whatever data rate has been established between the remote server and the user's platform. The entity is displayed on the user's screen and viewed by the user (Step 303). The user has a number of options, such as sending the displayed entity to storage or to a printer, or both, but nothing more happens until the user finishes with the first entity (304), and them selects a new entity to download.

Figure 3B:
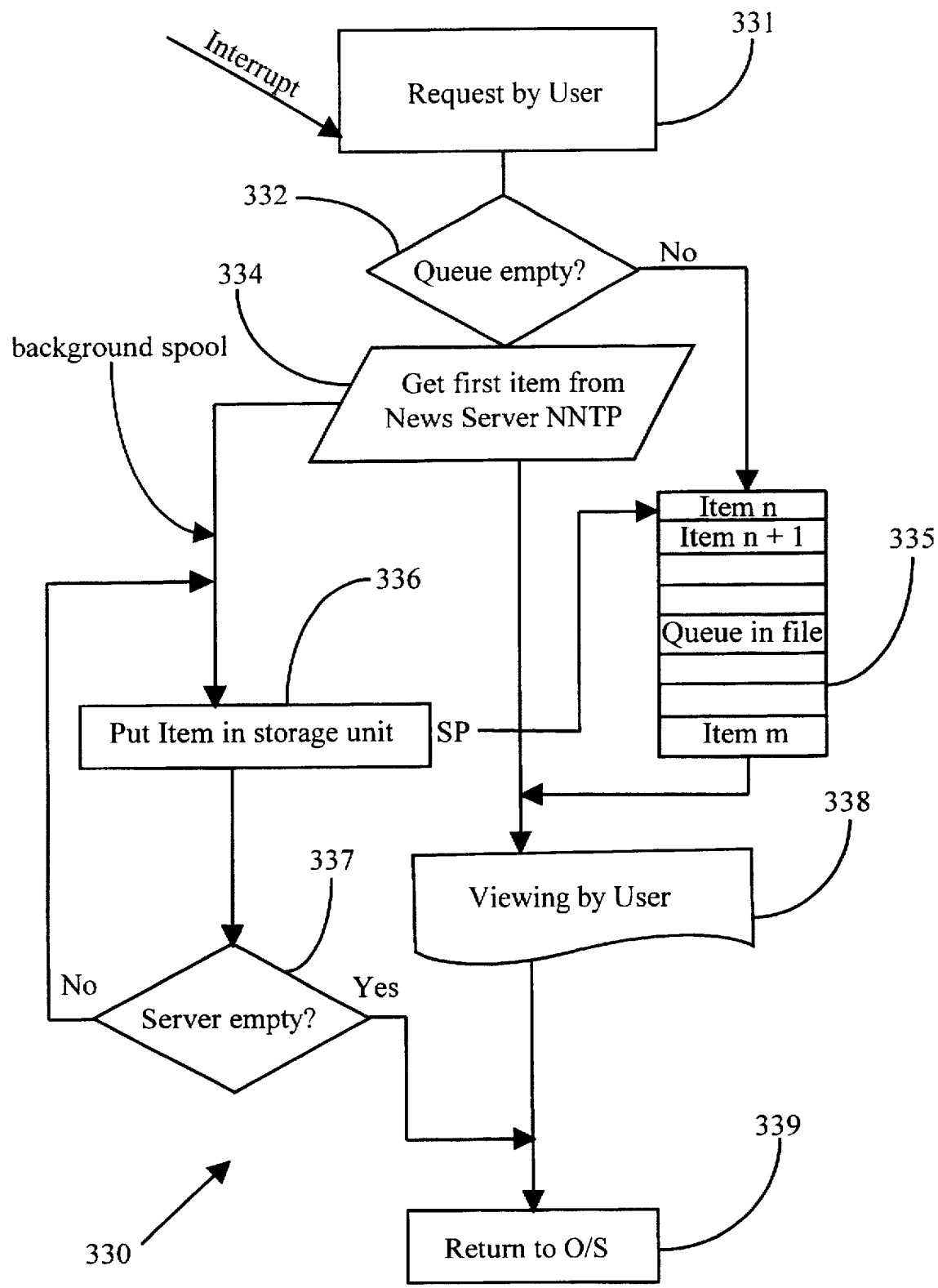
FIG. 3B is a flow diagram depicting a method of accessing information from the Internet according to an embodiment of the present invention.

Procedure 330 in FIG. 3B shows an enhanced procedure according to a preferred embodiment of the present invention. After a user request 331 the status of a queue or buffer 335 is checked. If the buffer is empty, a unique background process is started, mainly consisting of steps 336 and 337, downloading selected newsgroup entities into a queue 335, which may be a file on disk, but can also be in other suitable storage or memory. Meanwhile, the user can view at leisure out of queue 335 , as long as items are available. The viewing process can continue without an operating connection to the server, which means the user can view the items in 335 "off-line".

It will be apparent to those with skill in the art that there are many variations to the embodiments described above which may be made without departing from the spirit and scope of the invention. Several such alternatives have already been described, such as the several ways in which a fill-in bubble may be invoked. It is well-known, too, that there are many personal preferences in programming, and that like results may be obtained by alternative coding schemes. There are likewise many forms that the fill-in bubble of the invention might take. There are similarly many alternative implementations that may be made for the enhanced downloading technique described above.

What is claimed is:

1. A system for providing data for fields having coded field names in forms downloaded as code from a server on the Internet, comprising:

a central processing unit (CPU);

a display operable by the CPU;

stored fill entities associated with tags accessible by the CPU; and control code executable by the CPU;

wherein the CPU, executing the control code, compares the coded field names in the downloaded code with the tags associated with the stored fill entities, retrieves fill entities when a match is made, and associates retrieved fill entities with fields wherein the tags match the field names, preparatory to transmission to the server on the Internet.

2. The system of claim 1 further comprising a display bubble displayable by the CPU executing the control code, the display bubble displaying multiple tags associated with stored fill entities, wherein the user may associate any field with the display bubble, any one tag in the display bubble then being selectable by the user to cause the stored fill entity associated with the selected tag to fill the field associated with the bubble.

3. A method for providing data for fields having coded field names in forms downloaded as code from a server on the Internet and displayed on a display monitor, comprising steps of:

(a) invoking a display of tags associated with multiple stored fill entities;

(b) selecting a field in the displayed Internet form, thereby associating the field with the display of tags;

(c) selecting one of the tags in the display of tags, causing the stored fill entity associated with the selected tag to be entered in the selected field in the form; and (d) repeating steps (a) through (c) to fill additional fields in the form.

4. A method incorporating a computer having a display screen, the method for providing data for forms having fields with coded field names downloaded as code from a server on the Internet comprising steps of:

(a) associating fill entities with tags;

(b) storing the fill entities associated with the tags in a memory of the computer;

(c) downloading a form as code from a server on the Internet through a browser using the computer;

(d) associating the tags of the stored fill entities with coded field names in the code of the downloaded form; and (e) causing the stored fill entities with tags matching coded field names in the code of the downloaded form to be associated with the coded fields to which the tags match.

5. The system of claim 2 wherein the association of the display bubble with a field on the form is accomplished by positioning the display bubble to contact the field on the displayed form.

* * * * *